UNITED STATES PATENT OFFICE.

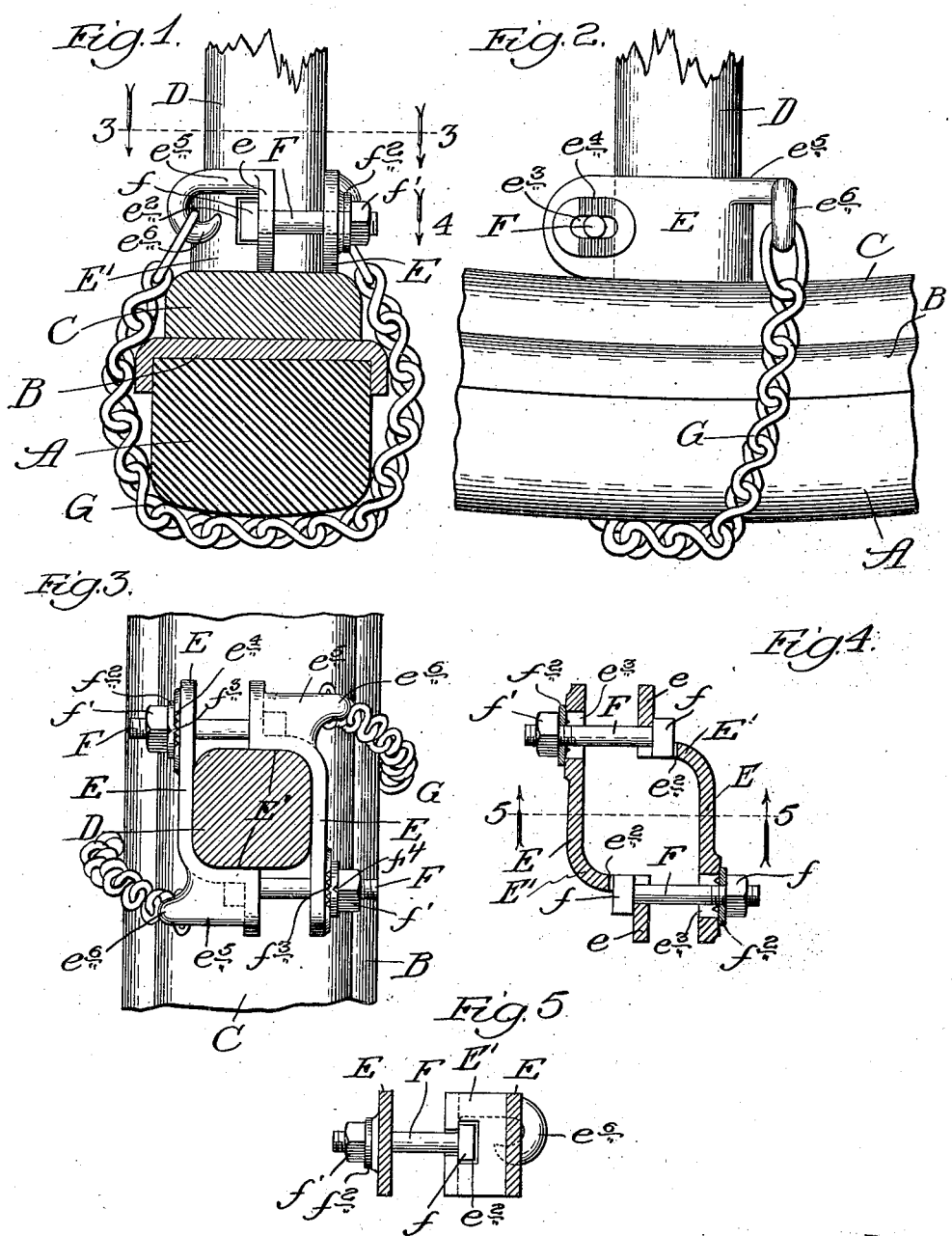

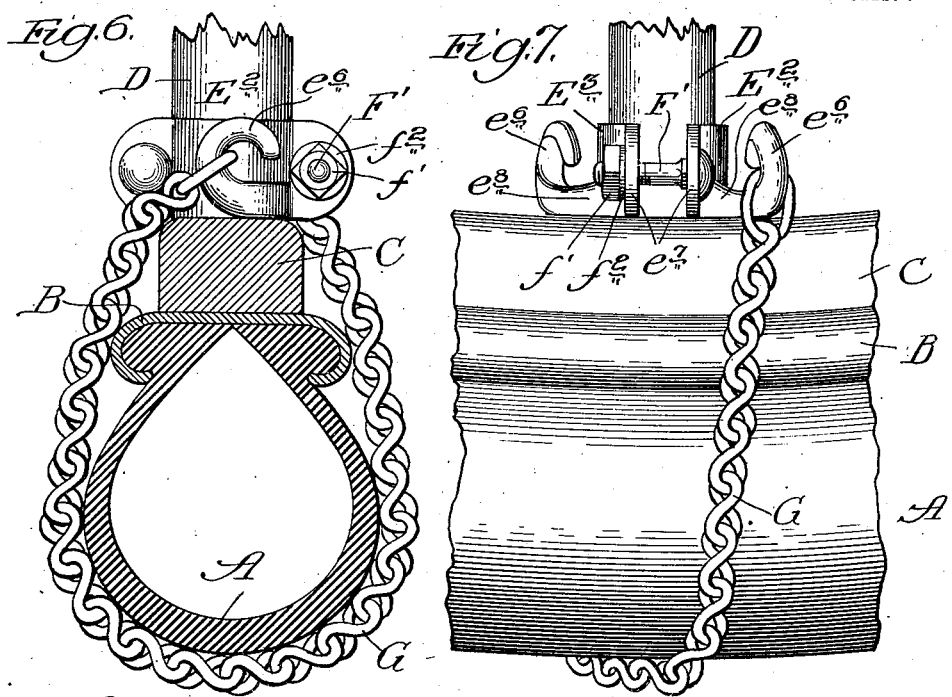
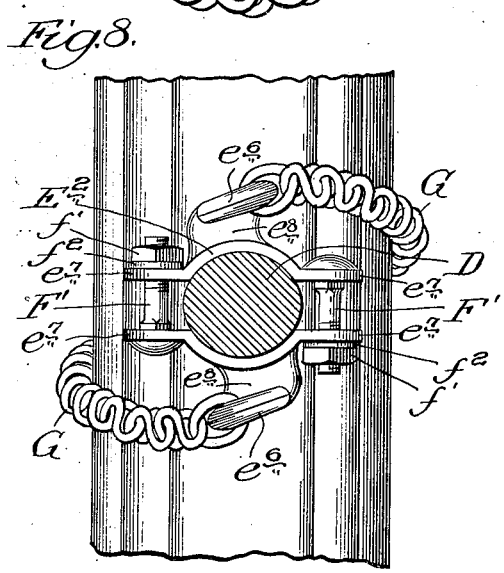

IRA ULFERS, OF FREEPORT, ILLINOIS.

ANTISKIDDING DEVICE FOR TIRES.

1,374,692. Specification of Letters Patent. Patented Apr. 12, 1921.

Continuation in part of application Serial No. 264,921, filed December 2, 1918. This application filed May 24, 1919. Serial No. 299,599.

*To all whom it may concern:*

Be it known that I, IRA ULFERS, a citizen of the United States, residing at Freeport, Stephenson county, Illinois, have invented certain new and useful Improvements in Antiskidding Devices for Tires, of which the following is a full, clear, and exact description, reference being had to the accompanying drawings, forming a part of this specification.

The present invention is a continuation in part of an application filed by me in the United States Patent Office December 2, 1918, Serial No. 264,921, and the invention has for its object to provide a simple, cheap and effective construction whereby the skidding of automobiles and like vehicles will be avoided.

My invention consists in the novel features of construction described in the specification, illustrated in the accompanying drawings and particularly pointed out in the claims at the end of the specification.

Figure 1 is a view in vertical cross section through the tire, the rim and the felly of a vehicle wheel (a portion of one of the wheel spokes being shown in elevation) having my invention applied thereto. Fig. 2 is a side elevation of the improved device and adjacent portions of the wheel. Fig. 3 is a view in horizontal section on the line 3—3 of Fig. 1 looking in the direction of the arrows Fig. 1 and showing the parts below the line on which said section is taken. Fig. 4 is a transverse section through the jaws of the clamp forming a part of my device. Fig. 5 is a section on line 5—5 of Fig. 4 through the clamp jaws of my device. Figs. 6, 7 and 8 are views similar to Figs. 1, 2 and 3 but showing a modified form of the invention and its application to a pneumatic rubber tire.

My invention, while applicable to a variety of wheels, is shown in the accompanying drawing as applied to a wheel having a solid rubber or pneumatic tire A engaged by a rim B suitably secured to the felly C of the wheel, the portion of one of the spokes D of the wheel being shown as extending from the felly C. These parts being of well known construction need not be more fully described.

My improved anti-skidding device comprises a clamp which, in the preferred embodiment of the invention, is formed of separate jaws adapted to be detachably bolted to the spoke of the wheel. Referring more particularly to the form of the invention illustrated upon Sheet 1 of the drawings, each of the spoke-engaging jaws is formed of a longitudinal member E and a transverse member E', that are arranged substantially at right angles to each other so that the members may engage the side and transverse faces respectively of the spoke D. Each of the members E and E' is provided with openings to receive through bolts F by which the jaws of the clamp are securely held together and upon the spoke D. As shown, the transverse member E' of each jaw is shorter than the width of the spoke and is provided at its end with an offset or ear $e$, each bolt F passing through the offset $e$ of the transverse member E' of one jaw and through the end portion of the longitudinal member E of the opposite jaw. Preferably the bolt hole in the offset $e$ merges into a T-shaped slot $e^2$ formed at the junction of the offset with the transverse member $e^1$. These T-shaped slots are adapted to receive the squared heads $f$ of the bolts F before the jaws are applied to the wheel spokes and, when applied, the bolts are securely retained in place and held against rotation. The outer end of each threaded bolt F passes through a slot $e^3$ in the end of the jaw member E and is fitted with a nut $f'$ and with a washer $f^2$. In order to guard against the slipping of the bolts F lengthwise of the slots $e^3$ there is formed on the outer face of each member E, adjacent the corresponding slot $e^3$, a toothed portion $e^4$ adapted to receive a tooth or rib $f^3$ formed on the adjacent face of the washer $f^2$. The elongated slots $e^3$ formed in the members E enable the clamp to be used upon spokes of different sizes and when the jaws are clamped together, as shown in Fig. 3 of the drawings, the parts will be securely held against accidental slipping. The adjustability of the clamp jaws to adapt the device for various sizes of spokes is an important feature, as it avoids the necessity of making different sizes of clamps for all the various sizes of spokes commonly employed.

Each of the transverse members E' of the clamp is provided at one edge with an arm or flange $e^5$ projecting circumferentially of the wheel, and which is provided at a point adjacent the intersection of the transverse and longitudinal members E and E' with an integral hook $e^6$. The hooks, as shown, are arranged in transverse radial planes, and are arranged adjacent but spaced from the transverse members (see Fig. 2) so that the end links of the tire chain G may be detachably engaged therewith. The hooks are oppositely facing and are provided with curved open terminals or bills which extend inwardly and in radial direction toward the basis of the hooks. With this arrangement, the tire chain G extends obliquely across the tread of the tire A, and the end links of the chain may be detachably engaged with the hooks and disengaged therefrom without removing the clamps from position on the spokes of the wheel. At the same time, pull or strain upon the chain will hold it in position, the hooks being so shaped that the chain will not be accidentally detached therefrom. In other words, the hooks are so shaped that the chain can be readily attached or detached, as required, but no additional means is necessary to prevent the accidental disengagement of the chains.

It will also be observed that by arranging the hooks $e^6$ as above described, these hooks are brought at diagonally opposite corners of the clamp when it is in position upon the spoke and when the ends of the tire chain G have been engaged by the hooks $e^6$, as shown in Figs. 1 and 2 of the drawing, the chain will extend across the tire tread in diagonal direction and in such manner as to give the best results.

In placing my improved anti-skidding device in position for use, the jaws will be placed in engagement with diagonally opposite corners of the spoke D, then the bolts F will be passed through the jaw members and through the washers $f^2$ and the nut $f'$ will be placed upon the threaded ends of the bolts. The tooth or rib $f^3$ in the washer, by engagement with the toothed portion $e^4$, will guard against the slipping of the corresponding bolt longitudinally of the slot $e^3$.

In the modified form of the invention illustrated on Sheet 2 of the drawings, the device is shown as formed of two similar transverse jaw members $E^2$ and $E^3$, the body portions of which are shaped to engage the transverse faces of the wheel spoke — which spoke in this instance is shown as of oval shape in cross section. Each of the jaws $E^2$ and $E^3$ is formed with outwardly projecting ends $e^7$ provided with a hole to receive a through bolt F', the hole at one end of each jaw being preferably squared to engage the correspondingly squared end portion of the bolt and thus guard against the accidental turning of the bolt. Each of the bolts F' is furnished with a retaining nut $f'$ and preferably, also, with a washer $f^2$.

From the side of each of the jaw members $E^2$ and $E^3$ an arm $e^8$ projects circumferentially. At the end of the arm and integrally therewith is formed a transverse radially disposed hook arranged adjacent but spaced from the jaw member and adapted to engage one end of the tire chain G. The projecting arms $e^8$ are adapted to extend circumferentially of the wheel when the device is in position for use thereon the chain-engaging hooks $e^6$ being located as shown in such a position that there is very little danger of their being accidentally struck and broken. In this modified form of clamp, as in that hereinbefore described, the location of the jaws is such that when the ends of the tire chain G have been engaged with the hooks $e^6$, the chain will extend diagonally around the tire.

From the foregoing description it will be seen that in both forms of my invention hereinbefore described, a simple and effective means is provided for holding the chains in oblique position upon the wheel tire so as to most effectively resist any tendency of the wheel to skid. So, also, the disposition of the hooks whereby the tire chains are held is such that the hooks are protected against danger of being struck or broken and the chains can be quickly attached to or detached therefrom without removing the clamps from the wheel spokes. Inasmuch as all parts of the clamp are within the space bounded by the outer edges of the rim, the clamps are left, if desired, permanently upon the spokes, the chains merely being detached therefrom when it is not desired to use them.

I claim as my invention:

1. An anti-skidding device for tires comprising a clamp having members adapted to extend transversely of the wheel and engage the opposite transverse faces of a wheel spoke, said transverse members having circumferentially projecting arms provided with oppositely facing, transversely and radially disposed hooks arranged adjacent but spaced from said transverse members and adapted to detachably engage the ends of a tire chain.

2. An anti-skidding device for tires comprising a clamp formed of separate jaws having portions adapted to extend transversely of the plane of the wheel and engage the opposite transverse faces of a wheel spoke, bolts for detachably securing said jaws to the wheel spoke, circumferentially projecting arms on said transverse portions, and radially disposed hooks on said arms extending in opposite directions transversely of the plane of the wheel and each having a curved open bill for detachably engaging the ends of a tire chain extending obliquely across the tire.

3. An anti-skidding device for tires, comprising a clamp adapted to detachably engage a wheel spoke, said clamp being formed of separate jaws, each of said jaws having angularly arranged members provided with bolt openings, bolts extending between said members for securing the jaws to the spokes, and each of said jaws being provided adjacent the meeting point of said members with hooks for detachably engaging the ends of a tire chain, said chain engaging hooks being arranged in radial transverse planes and being offset from each other in longitudinal direction, whereby the tire chain will pass obliquely across the tread of the wheel tire.

4. An anti-skidding device for tires, comprising separate clamping jaws each having longitudinal and transverse members for engaging the side and transverse faces respectively of a wheel spoke, said transverse members being shorter than said longitudinal members and having offset ears provided with openings for receiving the headed ends of bolts, and the longitudinal member of each jaw having a bolt hole adjacent its end, bolts extending between said members for securing the jaws to the wheel spoke, and said jaws having chain engaging hooks arranged in offset relation adjacent the intersections of said longitudinal and transverse members.

5. An anti-skidding device for tires comprising a clamp adapted to be detachably secured to a wheel spoke, said clamp having arms extending in opposite directions circumferentially from the wheel spoke, and oppositely facing, transversely and radially disposed hooks on said arms, said hooks having terminal open bills extending inwardly and radially toward the bases of the hooks and adapted to detachably engage the ends of a tire chain.

6. An anti-skidding device for tires, comprising two jaws each having a longitudinal and a transverse member arranged to engage the side and transverse faces respectively of a spoke, bolts for detachably securing said jaws to the spoke, the length of the transverse members being less than the width of the spoke and said transverse members having offset arms and T-shaped slots for receiving the headed ends of said bolts, and said longitudinal members having elongated slots receiving the opposite ends of said bolts, each of said jaws being provided adjacent the junction of its members with a curved hook arranged in a transverse plane for detachably engaging the end of a tire chain.

7. An anti-skidding device for tires comprising a pair of clamp members each having a hook and adapted to be clamped to a wheel spoke with said hooks transversely and radially disposed and offset in circumferential direction on opposite sides of the spoke to which the clamp is secured, said hooks having oppositely facing inturned open bills adapted to detachably engage the ends of a tire chain extending obliquely across the tire.

8. An anti-skidding device for tires comprising a pair of clamp members each having a hook adapted to be clamped to a wheel spoke with the hooks transversely and radially disposed and arranged adjacent but offset in circumferential direction from the opposite transverse faces of the spoke to which the clamp is secured and with all parts of the clamp within the space bounded by the outer edges of the wheel rim, said hooks having oppositely facing inturned open bills adapted to detachably engage the ends of a tire chain extending obliquely across the tire.

9. In an anti-skidding device for tires, comprising two jaws each having a longitudinal and a transverse member arranged to engage the side and transverse faces respectively of a spoke, bolts for detachably securing said jaws to the spoke, the length of the transverse member being less than the width of the spoke and having seats for receiving the headed ends of said bolts, and said longitudinal members having elongated slots receiving the opposite ends of said bolts, each of said jaws being provided adjacent the junction of its members with a hook arranged in a transverse plane and provided with an inturned open bill.

IRA ULFERS.